United States Patent

[11] 3,565,382

[72] Inventor Henry A. Passarelli, Jr.
Coventry, R.I.
[21] Appl. No. 758,037
[22] Filed Sept. 6, 1968
[45] Patented Feb. 23, 1971
[73] Assignee General Electric Company

[54] MOUNTING BRACKET FOR REMOTE CONTROL SWITCH
1 Claim, 5 Drawing Figs.
[52] U.S. Cl.................................................... 248/300,
174/58
[51] Int. Cl..................................................... H01h 9/02
[50] Field of Search........................................ 248/300,
223, 224, 225, 343; 339/125, 132; 174/52, 58, 61,
48; 336/65, 67

[56] References Cited
UNITED STATES PATENTS
| | | | |
|---|---|---|---|
| 1,843,054 | 1/1932 | Weinstein...................... | 248/343 |
| 1,901,235 | 3/1933 | Gloinacki....................... | 248/343 |
| 2,943,137 | 6/1960 | Van Wyngarden........... | 174/61 |

Primary Examiner—Roy D. Frazier
Assistant Examiner—J. Franklin Foss
Attorneys—Paul E. Rochford, Frank L. Neuhauser and Oscar B. Waddell ABSTRACT: Low voltage remote control switching systems utilize arrays of momentary contact switches which operate at low voltage and accordingly can be mounted either in an electric outlet box or directly onto a wall or other surface. A bracket is provided which adapts to the mounting of a manual master remote control switch either into switch boxes of various sizes as well as directly on a surface to receive the master switch.

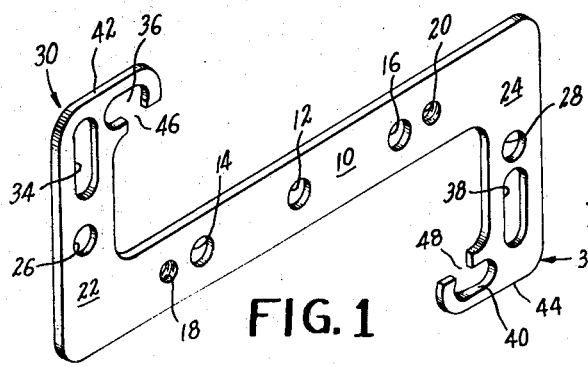

MOUNTING BRACKET FOR REMOTE CONTROL SWITCH

In the operation of remote control switching systems by which higher voltage higher current electric power is supplied to points of use through relay switches, the control of the relay switches is frequently accomplished using low voltage, low current power. Control of this low power electric current is used to actuate the magnetic plunger of a relay switch and accordingly to control higher power electric energy.

In other words, an electrically isolated low voltage low current control system is used to provide the control signals which actually move the magnetic plunger within a relay and the plunger performs the switching operation which controls the supply of high voltage high current power to electric lamp loads and other loads to be controlled by the overall system. Accordingly it is possible to mount the low voltage momentary contact switch at almost any location within a building because of the relatively low currents and voltages which are involved in this low voltage switching portion of the system. When a remote control system is installed in an older building, it is accordingly possible to run the low voltage wiring along the surface of building walls and to mount the low voltage switches at convenient places near doorways or the like, without need for or resort to the installation of electric receptacle boxes within the wall or extending out from the wall. Normally such boxes are required in conventional wiring systems because the voltage and current controlled by the switches is the conventional house current which is normally supplied at 120 volts and which may involve 5, 10, or 15 amperes of current flow.

The bell sized wire used for low voltage remote control switching replaces the need for heavy duty wire and avoids the requirements for shielding high current, high voltage within an armored cable, or within metal boxes mounted in or on a building wall. Alternatively where the remote control system is installed in a building at the time of construction, although the wire cable itself need not be contained within armored sheath cable, metal boxes are frequently provided at the desired switching locations within rooms or hallways to permit a manual master switch to be installed in the box. Such a switch is described in the copending application of Charles Shattuck and Thaddeus Pociecha, Ser. No. 758,202 filed Sept. 9, 1968, and assigned to the same assignee as this application.

It is accordingly one object of the present invention to provide means for mounting manual master control switches which permits reliable and rapid mounting of the switches. Another object of the present invention is to provide a means for mounting manual master remote control switches usable either in metal box switch receptacles or directly on a receiving wall surface.

Still another object of the present invention is to provide a mounting means which permits mounting of a manual master remote control switch in metal box receptacles of a plurality of sizes and configurations.

Other objects will be in part apparent and in part pointed out in the description which follows.

In one of its broader aspects the objects of the invention are achieved by providing a mounting strap having a general S configuration with an elongated midsection providing in each end thereof two slots to receive mounting screws, the long dimension of the slots in each end being oriented generally perpendicular to each other, and the slot nearest the end of the S being partially opened, and providing in the midsection of said S holes to receive mounting screws, said holes being disposed in said strap symmetrically about a center hole.

The understanding of the description of the present invention which follows will be aided and clarified by reference to the accompanying drawings in which:

FIG. 1 is a perspective view of the bracket of the present invention;

FIG. 2 is a illustration of the bracket mounted within a metal switch box;

FIG. 3 is an illustration of the bracket mounted in a switch box of different configuration;

FIG. 5 is an elevational illustration of a switch and cable mounted on a wall without a receptacle box.

Figure 4:
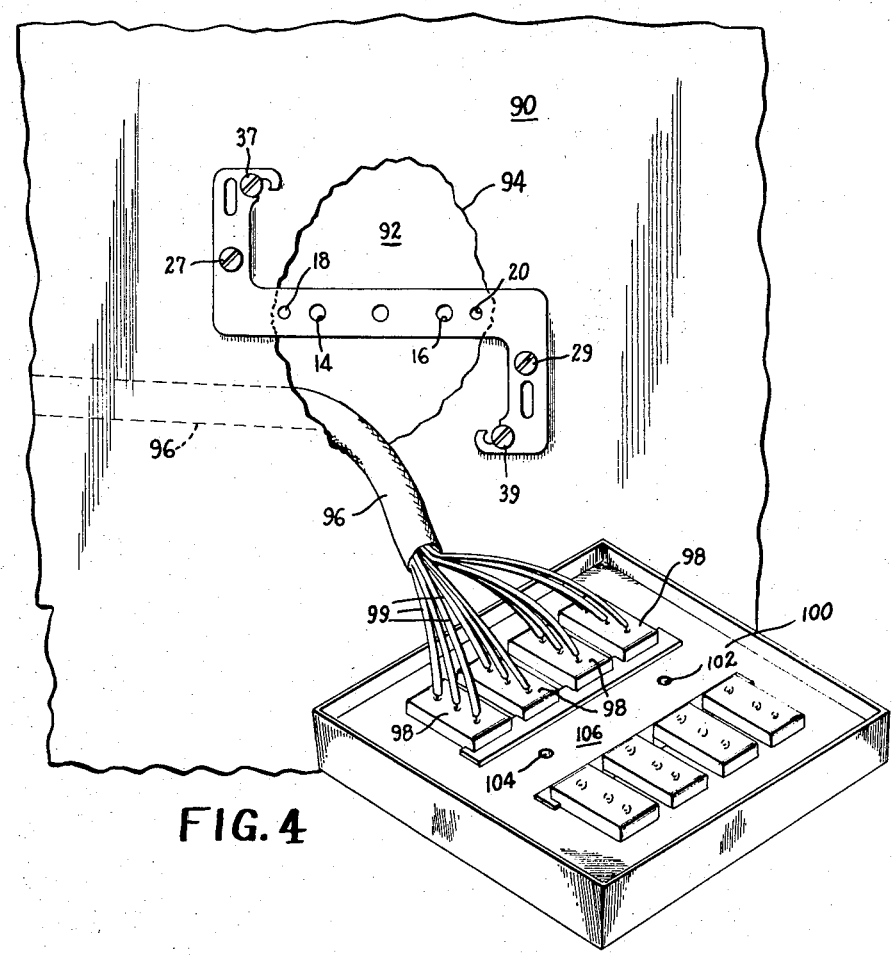
FIG. 4 is an elevational view of the bracket mounted on a wall without a receptacle wall box.

Referring first to FIG. 1 the bracket is seen to have a general S configuration with an extended center section 10. Within the center section a center hole 12 is provided midway between two similar holes 14 and 16 symmetrically disposed on either side of center hole 12. Going further out from the center two threaded holes 18 and 20 are provided also symmetrically disposed with regard to center hole 12. In the upright section 22 and 24 of the S configuration, two holes 26 and 28 are provided also symmetrically disposed with reference to center hole 12 and also with reference to the width of the vertical sections 22 and 24.

At each end 30 and 32 of the S configuration a pair of slots 34, 36 and 38, 40 is provided to receive mounting screws in the manner illustrated in FIGS. 2 and 3. As is evident from FIG. 1 the slot 34 lies parallel to the upright section of the S whereas the slot 36 lies generally normal to the upright section 22. Similarly slot 38 is parallel to the upright section 24 whereas slot 40 is normal to the upright section 24. It will also be noted that slot 34 is not symmetrically disposed with regard to center hole 12 when compared to slot 38. In particular slot 34 is disposed closer to the top 42 of the S configuration than slot 38 is disposed to the bottom 44 of the S configuration. Further, slot 36 is provided with sidewall opening 46 and slot 40 is provided with sidewall opening 48. The adjustability made possible by this array of slots is in part evident in the description below of the mounting of the bracket on wall boxes of different size and on wall surfaces where no wall box is provided.

In mounting the brackets in wall boxes of different configuration the slots 34, 36, 38 and 40 may be employed alternatively as needed and the mounting screws may be located at positions anywhere along these slots. Also because the slots lie at right angles to each other at each end a large variety of accommodations to various sizes and configurations of box may be made. For example, referring to FIG. 2, it is evident that the box 50 is generally square in shape and that the bracket fits within the overall configuration of the box. Two mounting screws 52 and 54 are mounted within the slots 34 and 38 respectively to hold the bracket at the face of the wall box 50. The mounting might have been made to similar effect using the two screw receiving tabs 56 and 58 by mounting the screws appropriately within the threaded holes 60 and 62 of these tabs.

As another illustration and referring now particularly to FIG. 3, it is evident that the slots 36 and 40 of the brackets are used in mounting the brackets on the wall box 70 of generally smaller configuration than the wall box 50. The screw receiving tabs 72 and 74 have multiple threaded holes therein two of which, 76 and 78, may be seen exposed along side of the ends of 32 and 30 of the bracket.

Obviously the bracket of the present invention is suitable for mounting on both surface mounted wall boxes and on recessed wall boxes of a variety of shapes and sizes.

Referring now to FIG. 4, the use of the bracket of the present invention in connection with a wall opening having no metal wall box mounted therein is shown and described. A section of wall 90 is shown to have an opening 92 broken therethrough and to have an irregularly-shaped edge 94. Behind the wall and shown in phantom is a section of cable 96 which emerges from behind the wall through the lower portion of opening 92. As is evident from the FIG., the cable 96 contains a larger number of strands of bell-type wire which are connected to the wires attached to the terminals of the individual switches 98. The switches themselves are held within the frame 100 of the manual master remote control switch. The holes 102 and 104 in the cross member 106 of the switch housing are spaced to match holes 14 and 16 or preferably threaded holes 18 and 20 of the bracket mounted across the opening 92. It will be evident that the mounting of the bracket is accomplished by screws 27 and 29 placed through the holes 26 and 28 of the bracket as seen in FIG. 1 or by the screws 37 and 39 placed in the holes 36 and 40 as best seen in FIG. 1. Alternatively the screws may be employed in all four holes or in other combinations of holes to advantageously secure the bracket to the wall surface.

It is apparent that the bracket of this invention accordingly makes readily feasible, because of the combination of mounting openings and its unique configuration, the mounting of manual master switches either with or without a metal wall box to receive the switch wiring.

Referring now to FIG. 5, there is illustrated the wall mounted manual master remote control switch in a wall installation in which the wall was not provided with a metal wall box and recessed wiring led beneath the wall surface to the wall box. The face of the switch 110 is seen in part broken away to expose the lower right hand section 112 of the bracket and a small portion 92 of the hole through the wall at that point. The cable 80 is shown in phantom between the wall switch and the upright door jamb 84. The cable 80 is shown to emerge from the wall adjacent to the door jamb and along the molding 82 to provide an external mounting of this cable.

I claim:

1. A mounting bracket for a multiswitch plate;
   said bracket comprising a strap having a general S configuration,
   each end portion of said S having two slots therein to receive mounting screws,
   the long dimension of the slots at each end being oriented generally perpendicular to each other,
   the slot nearest the end of said S being partially opened, and
   the mounting screw holes along the length of said strap between the ends thereof, said holes being disposed in said strap symmetrically about a center hole, and being distributed along each arm of said bracket.